United States Patent Office 3,534,484
Patented Oct. 20, 1970

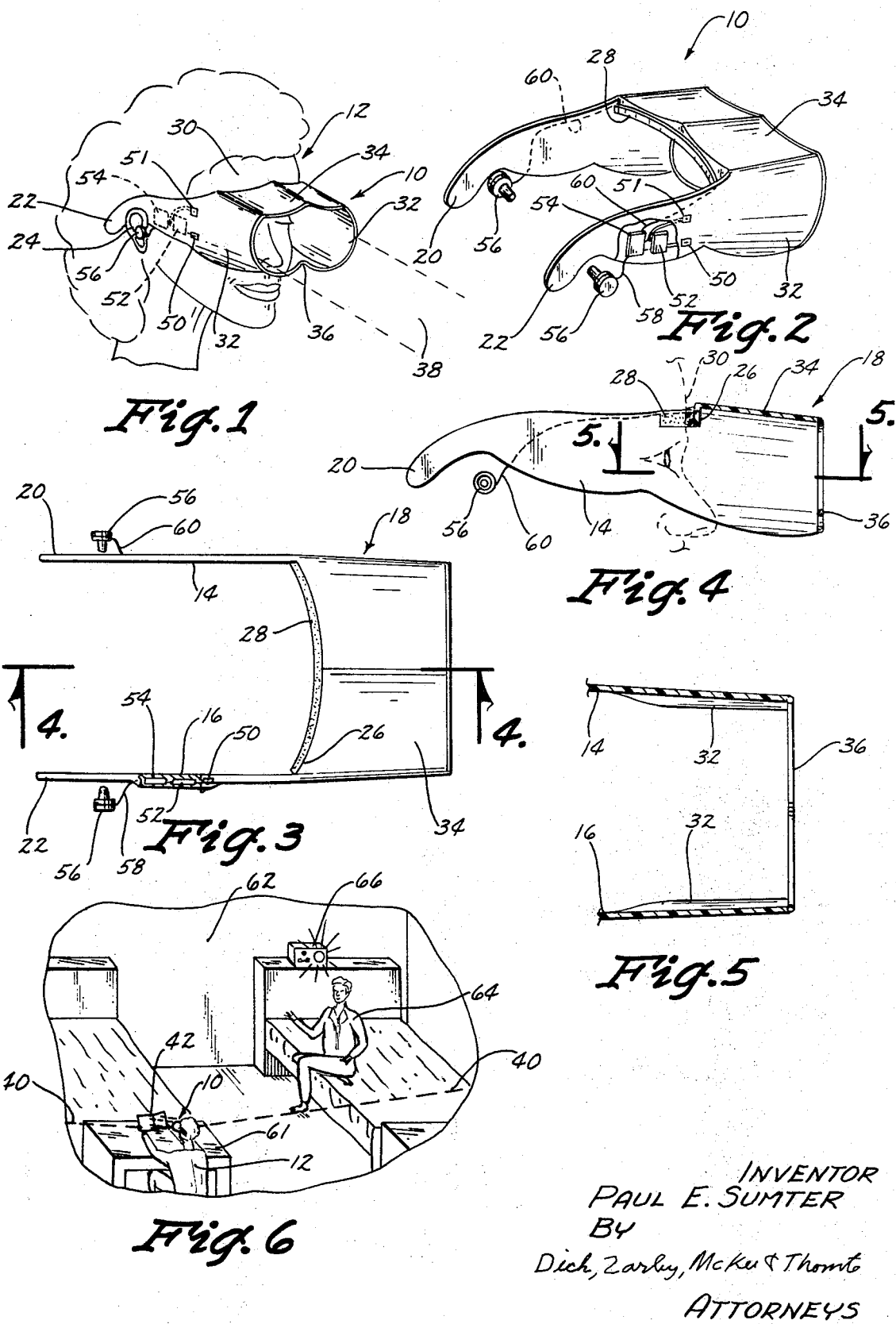

3,534,484
LEARNING AID
Paul E. Sumter, Ames, Iowa, assignor to Iowa State University Research Foundation, Ames, Iowa, a corporation of Iowa
Filed Dec. 4, 1967, Ser. No. 687,893
Int. Cl. G09b 5/00
U.S. Cl. 35—1
10 Claims

ABSTRACT OF THE DISCLOSURE

A device to be worn on a person's head having an ear piece which receives a signal from a sound generator, and an eye shield for projecting forwardly of the person's head to restrict the field of vision of the person to the subject matter being studied. The sound generator may be mounted on the frame of the device on the person's head for feeding a steady and consistent frequency and volume intensity low level audio frequency signal to each of the person's ears to shield the person from audible distractions and condition the person for faster and deeper concentration.

---

Students frequently are inefficient and ineffective in their studying because of their inability to concentrate on the subject matter before them. This lack of concentration may well be due to audible random unwanted sounds coming from within or outside the study room. Moreover, visual distractions in or outside the room will affect the student's power of concentration and consequnetly diminish the total work of the student.

It is therefore an object of this invention to facilitate concentration by shielding the person from distracting visual and audio stimuli and furnishing a signal-to-study sound/tone.

A further object of this invention is to condition the learner to more rapid and deeper concentration on the subject matter by supplying a signal sound/tone.

Yet another object of this invention is to provide a device for facilitating concentration which is portable and may be self contained on a frame to be worn on the person's head.

These and other features and advantages of this invention will become readily apparent to those skilled in the art upon reference to the following description when taken into consideration with the accompanying drawings, wherein:

FIG. 1 is a perspective view of the learning aid on a person's head;

FIG. 2 is a perspective view only of the learning aid device;

FIG. 3 is a top plan view or the learning aid device;

FIG. 4 is a cross-sectional view taken along line 4—4 in FIG. 3;

FIG. 5 is a fragmentary cross-sectional view taken along line 5—5 in FIG. 4; and FIG 6 is a perspective view of a dormitory study room.

The learning aid device of this invention is referred to generally in FIG. 2 by the reference numeral 10 and is shown in FIG. 1 on a person's head 12.

It is seen that the learning aid device 10 includes a frame having side temple members 14 and 16 interconnected along their forward ends by a visual shield 18. The rear ends 20 and 22 of the temple members 14 and 16 respectively are shaped to fit over the ears 24 of the person 12.

The visual shield 18 includes a rear concave edge 26 having a length of cushion material 28 for matingly engaging the forehead 30 of the person 12.

The visual shield 18 is further seen to include side wall portions 32 concave in shape on their inside and facing toward each other. These side wall portions 32 are an integral extension of the temple members 14 and 16 and are interconnected along their top edges by a top wall portion 34. The wall portions 32 are interconnected along their lower forward edges by a frame portion 36. Thus it is seen that the visual shield defines a sectorized line of sight 38 as seen in FIG. 1 which is substantially smaller than the normal peripheral vision of the person 12 as indicated by the dash lines 40 in FIG. 6. The sectorized line of sight 38 would be limited substantially to the material 42 being studied. A visual shield may be made of light plastic or similar nontransparent, translucent material and may be made of a size and shape to accommodate eye glasses which might be worn by the user.

The audio shield of this invention includes a small dry cell battery 50 connected through a switch 51 to a sound/tone generator 52 which in turn is connected to a sound/tone transmitter 54 which feeds a pair of ear plug receivers 56 through lead wires 58 and 60. The ear pieces 56 may be loosely connected to the temple members 14 and 16 to be conveniently positioned in the person's ears. The battery 50, switch 51, sound generator 52, and transmitter 54 are preferably molded into the temple member 16 to form an integral part thereof. However, the battery 50 is accessible such that it may be replaced as needed.

The sound/tone generator 50 should produce a low level audio-frequency signal for transmission to the ear of the learner. A control may if desired be provided to vary the output signal. Moreover, the signal should be steady and consistent in frequency volume intensity so that it shields the person from outside audio stimuli but does not irritate or interfere with the person's concentration. The particular sound including its frequency which will be most suitable for the learner will possibly vary from person to person. A signal in the range of 700 to 2,000 cycles per second should be acceptable.

In FIG. 6, the learning aid is seen in use on the person 12 studying at a desk 61 in a room 62 accommodating a second person 64 listening to a radio 66. This is a typical situation wherein there is both visual and audio distractions. The visual shield eliminates the visual distraction, the activity of the room mate 64 while the audio shield nullifies the effect of the distracting audio sounds from the radio 66. Consequently, the girl 12 is able to readily concentrate on the subject matter 42. The signal sound/tone is transmitted from the ear plugs, performing the two principal functions: (1) displaying random or unwanted sounds, and (2) producing a signal to suggest concentration to the learner. A learner is thus protected from inappropriate stimuli, and freed to concentrate fully upon the subject matter.

By simple conditioning, the learner will associate the signal with concentration. With practice, he or she will tend to develop habits of proceeding quickly and effectively to concentrate upon the assigned work. Under the precept that clear comprehension is a prerequisite to effective learning, the level of learning achievement can thus be enhanced by this invention.

Some changes may be made in the construction and arrangement of my Learning Aid without departing from the real spirit and purpose of my invention, and it is my intention to cover by my claims, any modified forms of structure or use of mechanical equivalents which may be reasonably included within their scope.

I claim:

1. A learning aid for maintaining concentration, comprising, a frame adapted to fit on a person's head,
a visual shield on said frame,
a sound generator, and
a sound receiver on said frame adapted to be positioned in an ear of the learner, said sound receiver being operably connected to said sound generator and receiving sound signals from said sound generator to shield the learner from audible distractions and conditioning the learner for faster and deeper concentration.

2. The structure of claim 1 wherein a sound transmitter is connected between said receiver and said generator on said frame.

3. The structure of claim 2 wherein said frame includes temple members and said sound generator and sound transmitter are positioned in one of said temple members.

4. The structure of claim 1 wherein said visual shield on said frame is adapted to restrict the field of vision of said leaner to the subject matter being studied.

5. The structure of claim 4 wherein said shield includes translucent side and top portions adapted to extend forwardly of the learner's head and around the learner's eyes.

6. The structure of claim 2 wherein a battery means is positioned on said frame and is connected to said sound generator.

7. The structure of claim 1 wherein said sound generator produces a low level audio frequency signal.

8. The structure of claim 7 wherein said low level audio frequency signal is steady and consistent in frequency and volume intensity.

9. The structure of claim 1 wherein said frame is an eye glass type frame having a pair of temple members having end portions adapted to fit over a person's ears and said visual shield interconnecting the opposite ends of said temple members for restricting the field of vision of said learner to the subject matter being studied.

10. The structure of claim 7 wherein said audio frequency signal is in the range of 7000 to 2,000 cycles per second.

References Cited

UNITED STATES PATENTS

| 2,304,095 | 12/1942 | Hull | 128—1 |
| 2,694,263 | 11/1954 | Francis et al. | 35—12 |
| 3,261,028 | 7/1966 | Coletta | 2—12 X |

FOREIGN PATENTS

| 1,036,013 | 4/1953 | France. |

OTHER REFERENCES

"Nature," Nov. 5, 1955, vol. 176, pp. 874–875.

WILLIAM H. GRIEB, Primary Examiner